Figure 1:
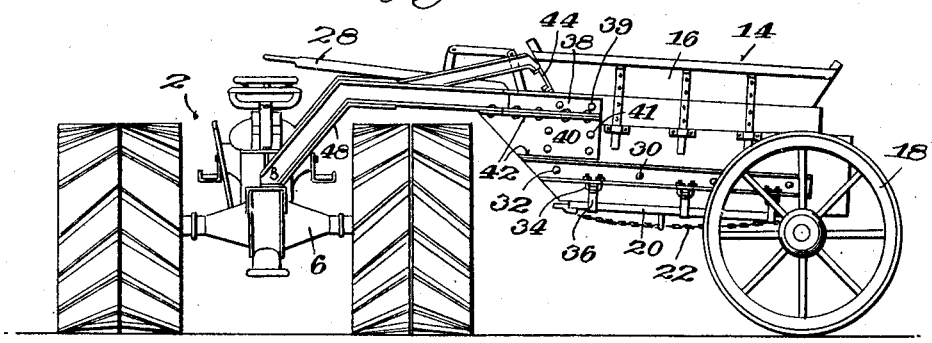

June 4, 1929.  C. M. LUCK  1,715,934

DUMPING VEHICLE

Original Filed June 8, 1925

Inventor
Charles Merle Luck,

By

Attorney

Patented June 4, 1929.

1,715,934

UNITED STATES PATENT OFFICE.

CHARLES MERLE LUCK, OF RICHMOND, VIRGINIA.

DUMPING VEHICLE.

Original application filed June 8, 1925, Serial No. 35,778. Divided and this application filed September 13, 1926. Serial No. 135,159.

This is a division of my co-pending application Serial No. 35,778, filed June 8, 1925.

The present invention relates to dumping vehicles or wagons of the type in which a load-carrying body has its bottom formed by a pair of movable doors hinged to the body at their outer edges and operated by a suitable arrangement of chains or cables and winding means into load sustaining and load discharging positions. Dumping vehicles of the class referred to are used in large numbers in hauling rugged and heavy loads, such as ores, dirt, gravel, rocks, and similar material, and are frequently required to operate over extremely rough and uneven roads, or in the absence of roads, over irregular ground surfaces. The nature of the loads and the severe conditions under which these vehicles are forced to operate makes the life of the vehicle and especially the load-carrying body, notoriously short. While various attempts have been made to strengthen and reinforce the bodies of dumping vehicles, such prior efforts have not proven entirely satisfactory, due to the fact that they did not achieve the desired end in effectively strengthening the body, or, on the other hand, so complicated the body construction as to render the cost of manufacture almost prohibitive.

A general object of the present invention is to improve the construction, increase the efficiency, lengthen the life of service, and reduce the cost of dumping vehicles of this character.

A further object of the invention is to provide novel bracing or reinforcing means for the body of the vehicle capable of resisting the most severe strains encountered during normal use.

A further feature of the invention consists in an improved method of supporting the load-sustaining doors in such a manner as to distribute the load over a large area of the body rather than placing excessive stresses at certain localized points.

With the above-mentioned and other objects in view, the invention consists in the novel construction and combination of parts hereinafter described, illustrated in the accompanying drawings, and pointed out in the appended claim. However, it is understood that various changes in the form, proportion, size and minor details of construction within the scope of the claim may be resorted to without departing from the spirit or sacrificing any of the advantages of the invention.

Figure 2:
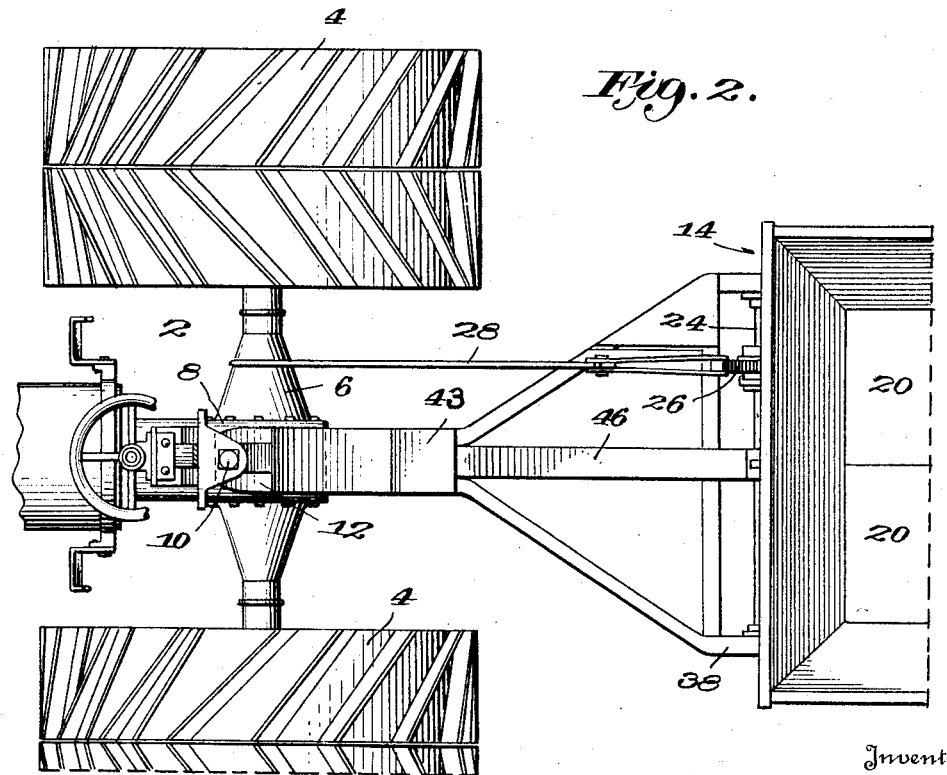

In the drawings,

Fig. 1 is a side elevation of an embodiment of my invention, illustrating the dumping vehicle and the rear end of a propelling vehicle; and Fig. 2 is a plan view thereof.

Referring more particularly to the drawings, wherein like characters of reference denote corresponding parts, 2 indicates generally, the rear portion of a suitable propelling vehicle, such as a tractor, supported at its rear end by the wheels 4, carried by an axle in the housing 6. The central portion of the housing supports a bridge member 8, upon which is mounted a coupling member 10 for connecting to the tractor the front extremity of the frame 12 of a dumping vehicle 14, the latter being illustrated as a trailer which is adapted to follow in the path of the propelling vehicle to which it is attached.

The trailer or dumping vehicle selected to illustrate an embodiment of the present invention is of the two-wheel type and, in general, consists of a wooden body 16 supported at its rear end by wheels 18. The bottom of the trailer body is formed by pivotally mounted doors 20 which are normally held in a horizontal position to close the body and support a load, and adapted, when released, to drop into a vertical position to discharge the load. The operation of the bottom doors is effected through the chains 22, the winding drum 24, the drum actuating mechanism 26, and the operating lever 28.

The frame for supporting and bracing the wooden trailer body will now be described. A sturdy channel beam 30 is attached to each side of the body of the trailer adjacent the lower edge thereof, said beam extending substantially the entire length of the body and being preferably secured in position by means of bolts 32. The channel beams brace the sides and reinforce the sides of the body throughout their entire length, and are located at a point which experience has shown is most likely to give away under hard usage. Beams 30 not only serve to brace the sides of the body, but also are utilized to support the bottom doors 20. Attached to the lower sides of the beams 32, at a plurality of points, are U-shaped loops 34. The legs of the loops extend upwardly through holes provided in the channel beams 5, and are secured in position by nuts threaded upon the free ends of the loops, or by turning over the ends to prevent withdrawal from the openings. The loops 34 form a pivotal bearing for straps 36, the opposite ends of which are rigidly secured to the outer edges of the bottom doors. From this construction it will be evident that the load carried by the doors will be directly sustained by the channel beams, and in this manner is distributed over a relatively large area, instead of being concentrated at particular localities, as would be the case if the door hinges were attached directly to the sides of the body.

Channel beams 38, similar in construction to the beams 30, are attached to the sides of the trailer body by bolts 39, the beams 38 being located adjacent to the upper edge of the body and projecting a substantial distance beyond the front of the trailer to form a connection between the trailer and the tractor or propelling vehicle, in the manner hereinafter described. The rear ends of the beams 38 and the front ends of the beams 30 are rigidly connected by heavy plates 40, the said plates being formed with top and bottom flanges 42 which are welded or bolted to the bottom of the beams 38 and the top of the beams 30 respectively. In addition, the plates 40 are rigidly secured at a plurality of points to the sides of the body by means of bolts 41.

The beams 38 extend parallel to each other for a short distance in front of the trailer, and thereafter converge toward a common point 43, located in the line of the longitudinal axis of the trailer body. A heavy channel beam 44 extends along the front face of the body adjacent the upper edge thereof, the said beam being connected at each end to one of the side beams 38. It should be noted that the cross beam 44 is supported by the side beam to which it is attached, and is preferably entirely unconnected with the front face of the body. This construction eliminates the usual strain ordinarily placed upon the front of a trailer body, which frequently results in the collapse of the entire front face. An I-beam 46 is supported at its rear end upon the central portion of the upper face of the cross beam 44, the front end of the I-beam merging with the side beams 38 at the point 43, where these beams are permanently secured together by any suitable means, such as welding, to form a unitary structure. From the point 43 the beams are bent downwardly to produce the terminal portion 12 which is connected to the bridge 8 of the propelling vehicle, in a manner previously described. In order to give additional strength to the frame at the bending point 43, the beams are connected by top and bottom reinforcing plates 48.

Trailers constructed in accordance with this invention have proven exceedingly efficient and durable, even when subjected to the most severe tests. While the body is made of wood, it is substantially reinforced at those points which ordinarily most readily collapse. There are no frail parts which are easily broken, so that it is not necessary to withdraw the trailer from service for repairs. The strain of the load is evenly distributed by the arrangement of the side beams over the entire length of the body, so that there is no tendency on the part of the body to collapse under a heavy load.

Having described the invention, what I claim as new and desire to secure by Letters Patent of the United States is:

In a dump vehicle, a wooden body, a lower channel beam secured to the exterior of each side of the body adjacent the lower edge thereof, an upper channel beam secured to the exterior of each side of the body along the upper edge thereof, said upper channel beams protruding beyond the front of the body and converging to a common point of juncture, a portion of said upper channel beams being disposed vertically above the lower channel beams, and plates having top and bottom flanges, said plate being fastened adjacent to the sides of the body, said top and bottom flanges of the plates being fastened to aforesaid upper and lower channel beams.

CHAS. MERLE LUCK.